United States Patent [19]

Ostrowski

[11] 4,326,834
[45] Apr. 27, 1982

[54] HELICOPTER ROTOR ASSEMBLY AND BLADE PITCH CONTROL

[76] Inventor: Stanislaw Ostrowski, P. O. Box 61, Gusher, Utah 84030

[21] Appl. No.: 45,698

[22] Filed: Jun. 5, 1979

[51] Int. Cl.³ .............................................. B64C 27/52
[52] U.S. Cl. ................................ 416/134 A; 416/138; 416/148
[58] Field of Search ................ 416/102, 114, 148, 115, 416/138 A, 134 A

[56] References Cited

U.S. PATENT DOCUMENTS

| | | | |
|---|---|---|---|
| 2,396,038 | 3/1946 | Bossi | 416/114 X |
| 2,961,051 | 11/1960 | Wilford et al. | 416/102 |
| 3,007,530 | 11/1961 | Doman et al. | 416/102 |
| 3,082,826 | 3/1963 | Doman et al. | 416/148 |
| 3,558,082 | 1/1971 | Bennie | 416/114 X |
| 3,734,644 | 5/1973 | Garcia | 416/114 |
| 3,933,324 | 1/1976 | Ostrowski | 416/129 X |
| 4,189,283 | 2/1980 | McCoubrey | 416/141 X |

*Primary Examiner*—Everette A. Powell, Jr.
*Attorney, Agent, or Firm*—Harvey B. Jacobson

[57] ABSTRACT

A helicopter including a driven rotor assembly provided with a hub having oscillatable rotor blades extending outwardly therefrom and axially spaced portions of the hub having outer peripheral portions of a pair of annular flexible and elastic supporting diaphragms anchored relative thereto. Inner peripheral portions of the diaphragms are deflected and stretched toward each other and anchored to a supporting flange carried by a central rotary drive shaft of the rotor assembly. A sleeve is longitudinally shiftably mounted on the shaft below the rotor assembly and supports, through the utilization of a flexible and resilient diaphragm, a larger sleeve structure therefrom for universal angular displacement of the sleeve structure relative to the sleeve. The sleeve structure includes control arms operatively connected to the rotor blades for oscillation of the latter in response to axial shifting of the sleeve structure relative to the sleeve. First control structure is provided for axially shifting the sleeve on the drive shaft and second control structure is provided for universally angularly displacing the sleeve structure relative to the sleeve. The helicopter further includes a third diaphragm supported control structure whose diaphragm is flexed in opposition to the flexed diaphragm of the second control structure and is manually universally shiftable and operatively connected to the second control structure for similar universal displacement thereof.

16 Claims, 11 Drawing Figures

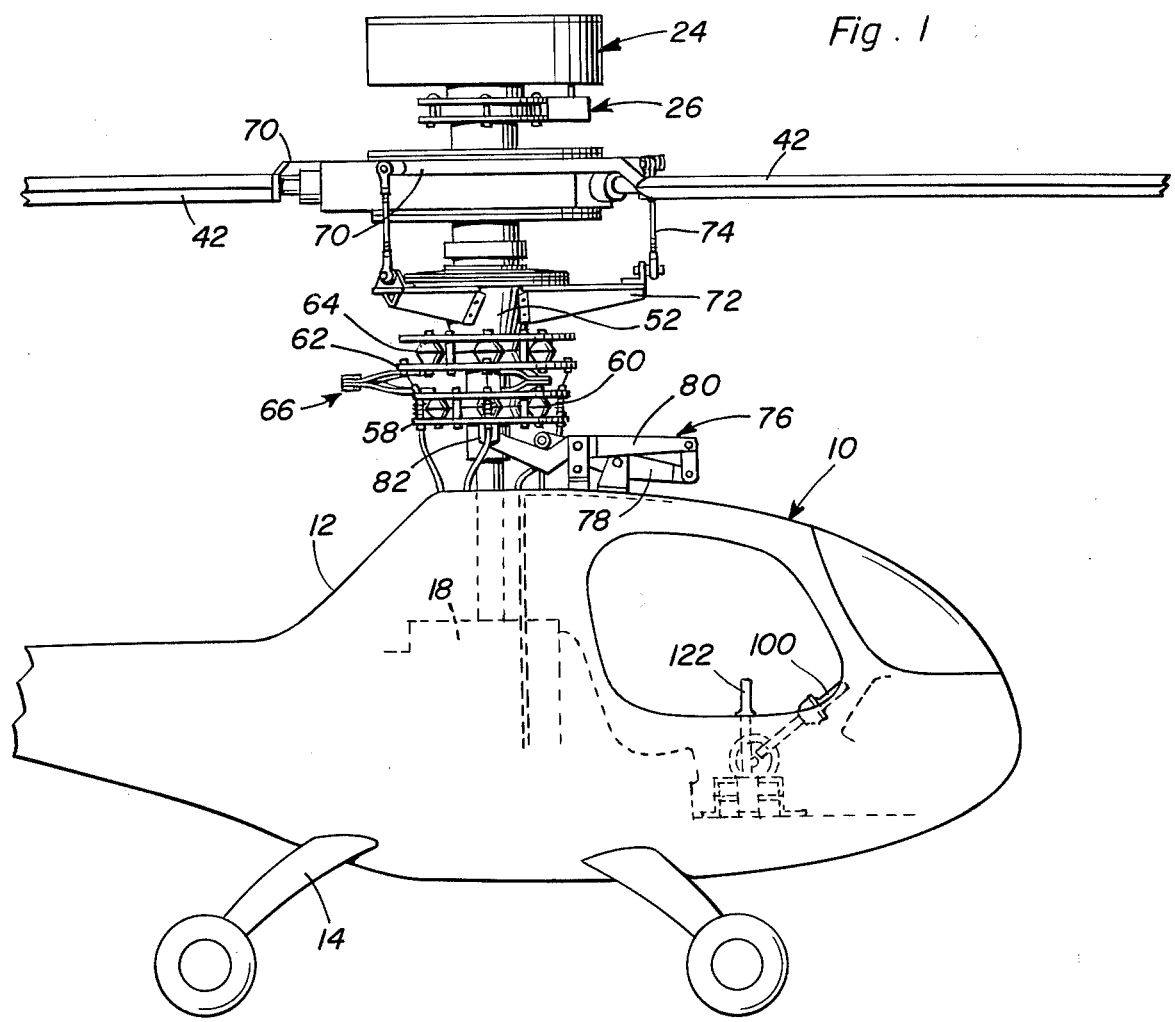
Fig. 1
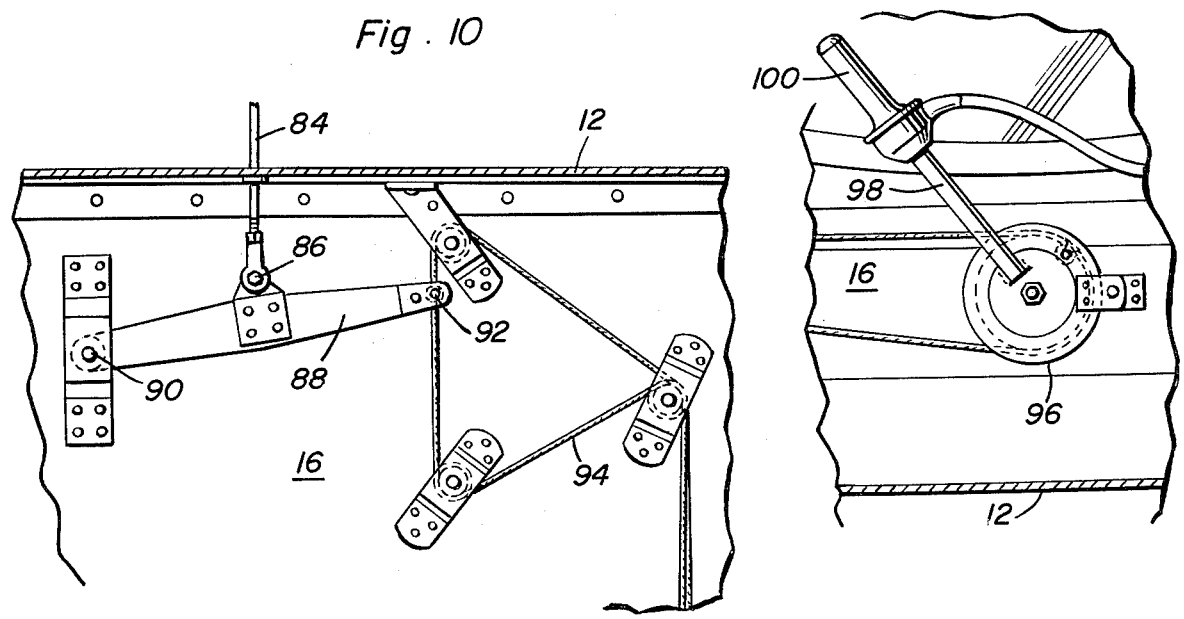
Fig. 10
Fig. 11

HELICOPTER ROTOR ASSEMBLY AND BLADE PITCH CONTROL

BACKGROUND OF THE INVENTION

The helicopter of the instant invention includes a rotor orbit canting control comprising an improvement over the similar structure disclosed in my prior U.S. Pat. No. 3,933,324, dated Jan. 20, 1976.

The control on conventional helicopters utilized to effect horizontal directional movement comprises a universally movable control stick usually under the control of the right hand of the pilot of the helicopter while a further control for controlling ascent and descent of the helicopter comprises an oscillatable lever usually under the control of the left hand of the helicopter pilot. The control stick is conventionally connected to the rotor blade pitch controls of the helicopter in a manner such that oscillations of the control stick are experienced by the right hand of the pilot as each blade of the rotor assembly swings pass a given point. Further, in order to control lateral direction, constant hand control by the helicopter pilot must be applied to the control stick. Accordingly, piloting a helicopter can be tiring and it is impossible for a conventional helicopter to be "trimmed" whereby the helicopter may be hovered in a substantially "hands off" manner relative to the control stick.

Accordingly, a need exists for a helicopter rotor assembly and control system therefor whereby the task of flying a helicopter may be made less tiring.

BRIEF DESCRIPTION OF THE INVENTION

The helicopter of the instant invention may include an upper propeller assembly spaced above the rotor assembly thereof such as provided on the helicopter disclosed in my prior U.S. Pat. No. 3,933,324, but the provision of the upper propeller assembly is not required. Rather, the helicopter of the instant invention utilizes a more or less conventional rotor assembly, except for the mounting of the hub portion of the rotor assembly and provides a unique manner of controlling the pitch of the blades of the rotor assembly as well as canting the orbit of the rotor assembly.

The main object of this invention is to provide a helicopter which may be piloted with less fatigue factor on the pilot of the helicopter.

Another object of this invention is to provide a helicopter with improved rotor blade oscillating control structure.

Still another important object of this invention is to provide a helicopter having improved rotor assembly control for canting the plane of orbit of the rotor assembly.

A further object of this invention is to provide an improved helicopter control whereby the blade angle positioning control may be "trimmed" for substantial "hands off" hovering of the helicopter.

Yet another object of this invention is to provide a helicopter in accordance with the preceding objects and whose improvement structures may be readily incorporated into existing helicopters as well as new helicopters being manufactured.

A final object of this invention to be specifically enumerated herein is to provide a helicopter control system which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of the helicopter of the instant invention;

FIG. 10 is a fragmentary vertical sectional view illustrating the manner in which the ascent and descent control lever is operatively connected to the rotor portion of the ascent and descent control; and FIG. 11 is a fragmentary vertical sectional view illustrating the mounting of the ascent and descent control lever.

DETAILED DESCRIPTION OF THE INVENTION

Figure 2:
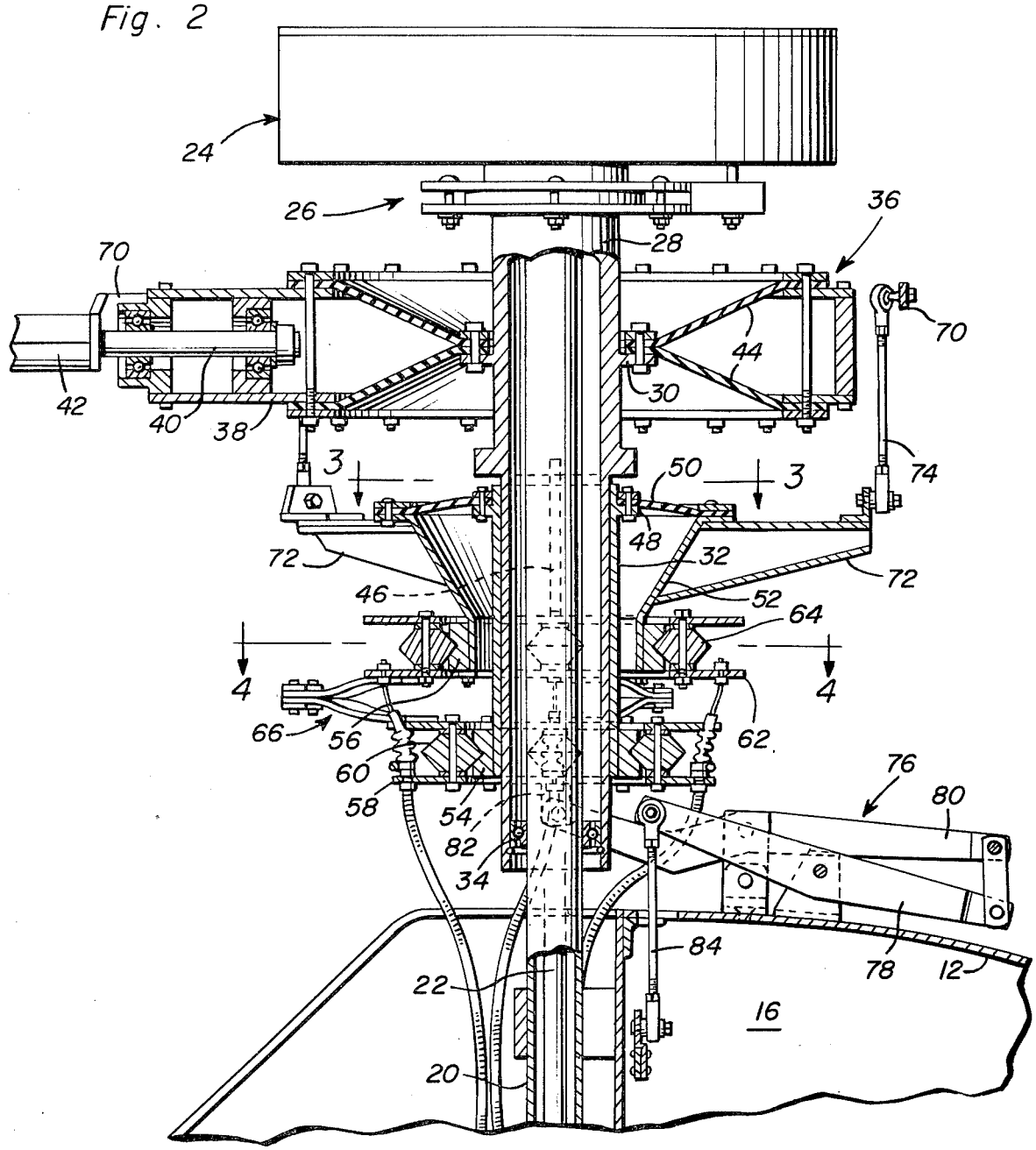
FIG. 2 is an enlarged fragmentary vertical sectional view of the central portion of the rotor assembly of the helicopter taken substantially upon a plane passing along the axis of rotation of the rotor assembly and adjacent control portions.
Figure 7:
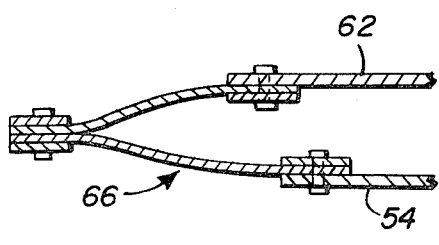
FIG. 7 is an enlarged fragmentary vertical sectional view taken substantially upon the plane indicated by the section line 7—7 of FIG. 4.

Referring now more specifically to the drawings, the numeral 10 generally designates a helicopter including a fuselage 12 provided with landing gear 14. The fuselage 12 defines an interior cockpit 16 and encloses a prime mover 18.

An upstanding tubular support shaft 20 has its lower end supported within the fuselage 12 and encloses the rotary output shaft 22 of the prime mover 18. The upper end of the support shaft 20 projects upwardly through the upper portion of the fuselage 12 and its upper end supports a gearing assembly referred to in general by the reference numeral 24 similar to that enclosed within the housing (54) of my above-mentioned prior patent. Additionally, a slip and overrunning clutch assembly referred to in general by the reference numeral 26 similar to the corresponding structure disclosed in my prior patent is provided and the gearing assembly includes a depending tubular rotary output shaft 28 corresponding to the sleeve (80) of my prior patent. Although the output shaft 22 could project upwardly through the top of the gearing assembly 24 and include a small bladed propeller, such as that shown at (78) in my prior patent, the illustration of such a propeller is omitted for simplicity sake.

The rotary output shaft 28 has a mounting flange 30 supported on its upper end portion and a longitudinally shiftable sleeve 32 is mounted on the lower end portion of the output shaft 28, a bearing 34 journaling the lower end of the output shaft 28 from the support shaft 20.

A rotor assembly referred to in general by the reference numeral 36 is supported from the flange 30 of the output shaft 28. The rotor assembly 36 includes a rigid annular hub 38 from which the root ends 40 of generally radially extending rotor blades 42 are oscillatably supported. The hub 38 is of appreciable axial extent and the outer peripheral marginal portions of a pair of flexible and resilient torque transmitting and rotor assembly supporting diaphragms 44 are anchored relative to the upper and lower axial ends of the hub 38.

The inner peripheral portions of the diaphragms are stretched and deflected toward each other and secured to the flange 30. Accordingly, the hub 38 is universally supported from the output shaft 28.

The sleeve 32 includes a spline connection 46 with the output shaft 28 and includes a mounting flange 48 to which the inner periphery of a third flexible and resilient diaphragm 50 is anchored. A larger sleeve structure 52 is loosely telescoped over the sleeve 32 and the outer marginal portion of the third diaphragm is anchored relative to the upper end of the sleeve structure 52.

The lower end of the sleeve 32 has a circumferentially grooved race 54 supported therefrom and the lower end of the sleeve structure 52 has a circumferentially grooved race 56 supported therefrom. An annular framework 58 journaling a plurality of circumferentially spaced V-shaped rollers 60 is disposed about the race 54 with the rollers 60 seated in the groove of the race 54. A second annular framework 62 having a plurality of circumferentially spaced V-shaped rollers 64 supported therefrom encircles the race 56 with the rollers 64 seated in the groove of the race 56 and flexible indexing strap structures 66 are spaced about and anchored between corresponding circumferentially spaced portions of the upper and lower frameworks 62 and 58.

The rotor blades 42 include angulated control arms 70 supported therefrom and the sleeve structure 52 includes an equal number of radially outwardly projecting arms 72 supported therefrom. A plurality of adjustable length links 74 are pivotally interconnected between the free ends of corresponding arms 70 and 72. Further, an actuating lever assembly referred to in general by the reference numeral 76 is supported atop the fuselage 12 closely forward of the support shaft 20 and includes an input lever 78 and a pair of output levers 80. The output levers 80 are pivotally connected to anchors 82 carried by diametric opposite portions of the framework 58 and the lever 78 has the upper end of an upstanding link 84 pivotally connected thereto. The lower end of the link 84 is pivotally connected as at 86 to the midportion of a control lever 88 having one end portion pivotally anchored as at 90 within the fuselage 12 and the other end of the lever 88 is anchored as at 92 to the midportion of a control cable 94 whose ends are secured about an oscillatable control pulley 96 within the fuselage 12 and having a control lever 98 supported therefrom including a twist grip control 100 on its free end for the throttle of the prime mover 18.

Figure 8:
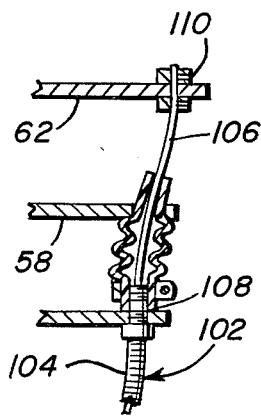
FIG. 8 is an enlarged fragmentary vertical sectional view illustrating one of the pull cable controls for effecting blade angle adjustment and canting the plane in which the rotor assembly swings.
Figure 3:
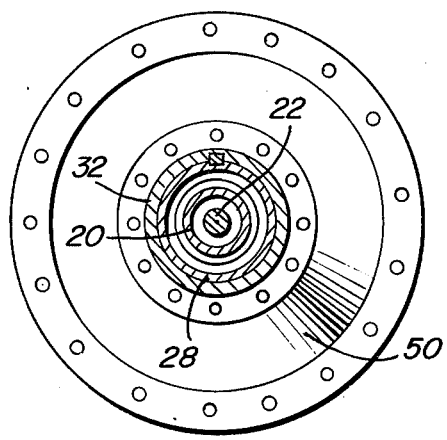
FIG. 3 is a horizontal sectional view taken substantially upon a plane indicated by the section line 3—3 of FIG. 2.
Figure 9:
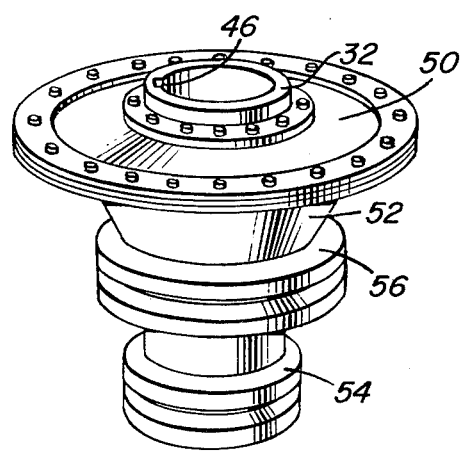
FIG. 9 is a perspective view of the axially shiftable control sleeve and universally adjustable larger sleeve structure supported therefrom.
Figure 4:
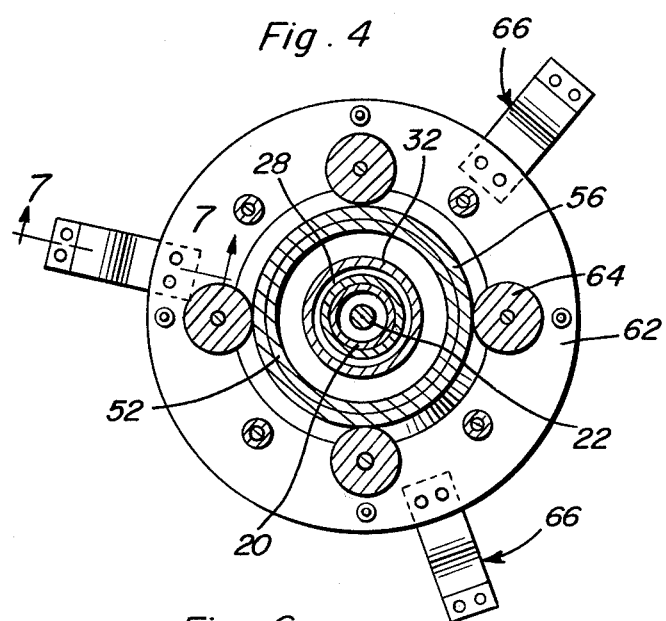
FIG. 4 is a horizontal sectional view taken substantially upon a plane indicated by the section line 4—4 of FIG. 2.
Figure 6:
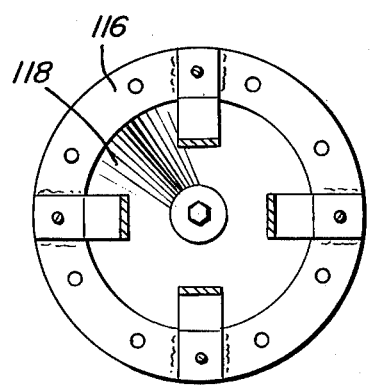
FIG. 6 is horizontal sectional view taken substantially upon the plane indicated by the section line 6—6 of FIG. 5.

Four Bowden type control cables referred to in general by the reference numerals 102 and including stationary outer housings 104 and longitudinally reciprocal inner cores 106 have one set of corresponding ends of the housings 104 adjustably anchored relative to the framework 58 as at 108 (see FIG. 8) and the corresponding ends of the cores 106 adjustably anchored relative to the framework 62 as at 110. The cables 102 comprise two pairs of cables with the housings 104 and cores 106 of each pair supported from diametric opposite portions of the frameworks 58 and 62 and the two pairs of cables 102 disposed on diameters of the frameworks 58 and 62 disposed at right angles relative to each other.

The other set of ends of the housings 104 are similarly anchored relative to a support frame 112 supported from the floor 114 of the fuselage 12 and the other set of ends of the cores 110 are similarly anchored relative to a support ring 116. The support ring 116 is anchored relative to the outer periphery of a flexible and resilient diaphragm 118 and the central portion of the diaphragm is adjustably stationarily anchored relative to the floor 114 by a support stud 120. The support ring 116 supports the lower end of an upstanding control stick 122 and thus the control stick 122 may be angularly displaced in a universal manner in order to effect similar universal angular displacement of the framework 62 relative to the framework 58, the flexure of the diaphragm 50 opposing an opposite flexure of the diaphragm 118. Accordingly, the diaphragms 50 and 118 function to resiliently bias the control stick 122 to a centered neutral position and to also yieldingly bias the rotor blade 42 toward a predetermined position, the adjustment capabilities of the stud 120 and the links 74 enabling a considerable range of adjustment of the angular displacement of the rotor blades 42 when the control stick 122 is in its centered position.

In operation, when it is desired to operate the helicopter 10 in an ascent mode, the lever 98 is pulled rearwardly to the position thereof illustrated in FIG. 11 whereupon the sleeve 32 will be shifted along the output shaft 28 in a manner to vary the pitch of the rotor blades through the arms 72, links 74 and arms 70 in order to effect ascent of the helicopter. In addition, forward movement of the control lever 98 will effect reverse adjustment of the pitch of the rotor blades 42 so as to cause operation of the helicopter in a descent mode.

Figure 5:
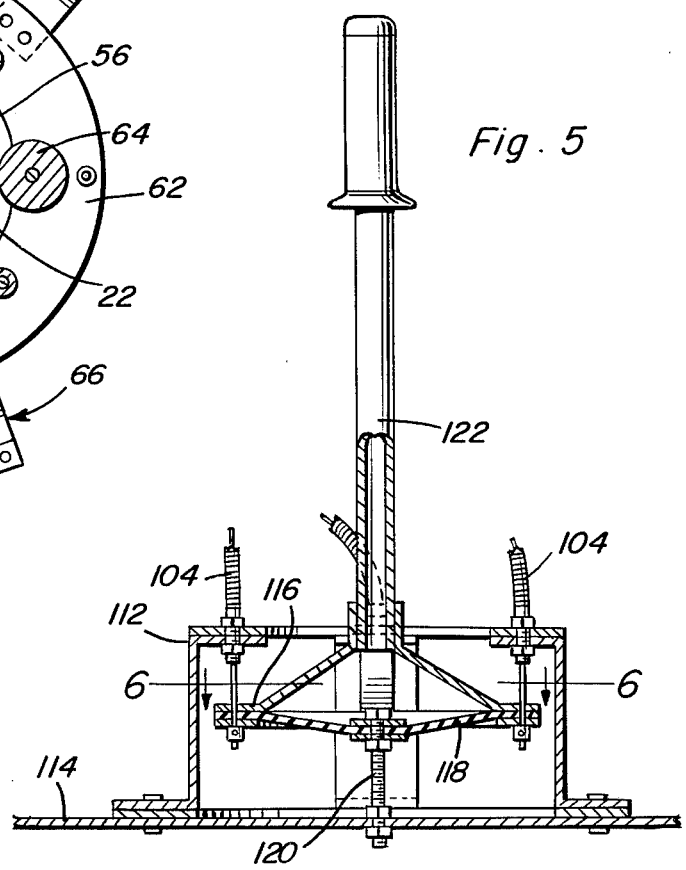
FIG. 5 is a fragmentary enlarged vertical sectional view taken substantially upon a plane passing through the center of the blade pitch and rotor orbit canting cockpit control of the helicopter.

When the control stick 122 is angularly displaced from the neutral position thereof illustrated in FIG. 5, the sleeve structure 52 is similarly canted and thus the links 74 serve to also cant the hub 38 relative to the output shaft 28.

In addition to the diaphragms 50 and 118 opposing each other, the diaphragms 44 oppose each other and thus tend to maintain the hub 38 in a centered position coaxial with the output shaft 28.

Because of the novel controls by which the sleeve 32 may be shifted along the output shaft 28 and the sleeve structure 52 may be canted relative to the sleeve 32, the controls of the helicopter may be "trimmed" to a particular desired flying mode. Thus, fatigue of the pilot of the helicopter 10 is almost non-existent when flying the helicopter 10 in the aforementioned mode.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A helicopter rotor assembly including upright journaled support shaft means, an annular hub loosely disposed about said shaft means, a pair of annular flexible and resilient diaphragms having their outer peripheral portions anchored relative to axially spaced first inner marginal peripheral zones of said hub and their inner peripheral portions anchored relative to second peripheral zones of said shaft means oppositely axially spaced relative to the radial planes in which the corresponding first zones are disposed, said diaphragms each being radially stretched, and thus functioning in opposition to each other to yieldingly resist axial displacement of said hub relative to said shaft means from a predetermined position therealong and further function in concert to yieldingly resist angular displacement of the plane of rotation of said hub relative to a predetermined plane generally normal to the axis of rotation of said shaft means.

2. The combination of claim 1 wherein said diaphragms are also circumferentially stretched.

3. A helicopter rotor assembly including upright journaled support shaft means, an annular hub disposed about said shaft means, a pair of annular flexible and resilient diaphragms having their outer peripheral portions anchored relative to inner marginal portion of said hub and their inner peripheral portions anchored relative to portions of said shaft means spaced radially inwardly of said inner marginal portion, said inner peripheral portions being oppositely axially spaced relative to radial planes in which the corresponding outer peripheral portions are disposed, said diaphragms each being radially stretched, and thus functioning in opposition to each other to yieldingly resist axial displacement of said hub relative to said shaft means from a predetermined position therealong and further function in concert to yieldingly resist angular displacement of the plane of rotation of said hub relative to a predetermined plane generally normal to the axis of rotation of said shaft means.

4. The combination of claim 3 wherein said outer peripheral portions are disposed in radial planes of said shaft means disposed on remote sides of a radial plane of said shaft means in which said inner peripheral portions are disposed.

5. The combination of claim 4 wherein said diaphragms are also circumferentially stretched.

6. The combination of claim 3 including a sleeve mounted on said shaft means for rotation therewith and axial shifting therealong, a larger diameter sleeve structure loosely disposed over said sleeve, an annular flexible and resilient support panel having its outer peripheral portions anchored relative to said sleeve structure and its inner peripheral portions anchored relative to said sleeve, said rotor assembly including circumferentially spaced and outwardly projecting rotor blades oscillatably supported from said hub for angular displacement about their longitudinal axes relative thereto, and control means connected between said blades and sleeve structure for oscillating said blades responsive to back and forth axial shifting of said sleeve structure relative to said shaft means, said control means also including means for adjustably universally canting said hub responsive to similar universal canting of said sleeve structure relative to said shaft means.

7. The combination of claim 3 including a sleeve structure loosely disposed over said shaft, an annular flexible and resilient support panel having its outer peripheral portions anchored relative to said sleeve structure and its inner peripheral portions anchored relative to said shaft, said rotor assembly including circumferentially spaced and outwardly projecting rotor blades supported from said hub, and control means connected between said blades and sleeve structure for adjustably universally canting said hub responsive to similar universal canting of said sleeve structure relative to said shaft means.

8. The combination of claim 6 including a helicopter frame from which said support shaft means is journaled, said control means including thrust means operatively connected between said frame and sleeve structure for selectively axially shifting said sleeve structure relative to said shaft means.

9. The combination of claim 8 wherein said control means includes first rotary means carried by said rotor assembly and second means carried by said frame yieldingly biasing said sleeve structure toward a predetermined shifted position relative to said shaft means.

10. The combination of claim 9 wherein said first and second means include yieldable thrust means operative in opposition relative to each other.

11. The combination of claim 10 wherein at least one of said first and second means includes adjustable means for adjustably varying the thrust developed thereby.

12. The combination of claim 11 wherein the other first and second means includes a manually controllable shiftable portion thereof shiftable to effect universal canting of said sleeve structure.

13. A helicopter rotor assembly including upright journaled support shaft means, an annular hub disposed about said shaft means, annular flexible and resilient diaphragm means including a pair of annular diaphragm portions each having inner and outer marginal portions, said outer marginal portions being anchored relative to the inner marginal portion of said hub and said inner marginal portions being anchored relative to said shaft means, one set of corresponding marginal portions being axially spaced apart and the other set of corresponding marginal portions being less spaced apart, said diaphragm means being radially stretched, and thus functioning in opposition to each other to yieldingly resist axial displacement of said hub relative to said shaft means from a predetermined position therealong and further function in concert to yieldingly resist angular displacement of the plane of rotation of said hub relative to a predetermined plane generally normal to the axis of rotation of said shaft means.

14. The combination of claim 13 wherein said other set of corresponding marginal portions are separately formed, but disposed in axial side-to-axial side abutting relation.

15. The combination of claim 14 wherein said other set of corresponding marginal portions comprise said inner marginal portions.

16. A helicopter rotor assembly including upright journaled support shaft means, an annular hub disposed about said shaft means, radially stretched resilient and flexible annular diaphragm means including inner and outer marginal portions, the outer marginal portion of said diaphragm means being anchored relative to the inner marginal portion of said hub and the inner marginal portion of said diaphragm means being anchored relative to said shaft means, said diaphragm means being radially stretched and including structure functioning to allow and to yieldingly resist axial displacement of said hub relative to said shaft means from a predetermined position therealong and also functioning to yieldingly resist angular displacement of the plane of rotation of said hub relative to a predetermined plane generally normal to the axis of rotation of said shaft means.

* * * * *